US 6,677,591 B1

(12) United States Patent
Kim

(10) Patent No.: US 6,677,591 B1
(45) Date of Patent: Jan. 13, 2004

(54) METHOD AND SYSTEM FOR INSPECTING OPTICAL DEVICES

(75) Inventor: Wonoh Kim, Woodstock, MD (US)

(73) Assignee: Ciena Corporation, Linthicum, MD (US)

( * ) Notice: Subject to any disclaimer, the term of this patent is extended or adjusted under 35 U.S.C. 154(b) by 80 days.

(21) Appl. No.: 10/060,583

(22) Filed: Jan. 30, 2002

(51) Int. Cl.$^7$ ................................................ G01N 21/00
(52) U.S. Cl. ...................... 250/341.1; 356/73; 250/330
(58) Field of Search ............................ 250/341.1, 341.2, 250/330; 356/73.1; 385/24, 99, 116; 348/141; 374/45, 57, 120

(56) References Cited

U.S. PATENT DOCUMENTS

| | | | |
|---|---|---|---|
| 3,936,143 A | | 2/1976 | Sato ............................ 350/96 |
| 4,222,664 A | * | 9/1980 | Beasley ....................... 356/73.1 |
| 4,372,768 A | | 2/1983 | Zucker et al. ................ 65/4.21 |
| 4,652,123 A | | 3/1987 | Neumann ..................... 356/73.1 |
| 4,688,939 A | | 8/1987 | Ray ............................. 356/237 |
| 4,906,099 A | | 3/1990 | Casasent ....................... 356/394 |
| 4,988,875 A | | 1/1991 | Ortiz et al. ................... 250/330 |
| 5,172,421 A | * | 12/1992 | Nakamura et al. ........... 382/141 |
| 5,196,899 A | * | 3/1993 | Serwatka ..................... 356/73.1 |
| RE34,345 E | * | 8/1993 | Vinarub et al. .............. 356/635 |
| 5,315,365 A | | 5/1994 | Hakimi et al. ............... 356/73.1 |
| 5,570,227 A | | 10/1996 | Nabeyama et al. .......... 359/341 |
| 5,712,937 A | * | 1/1998 | Asawa et al. ................ 385/49 |
| 5,715,334 A | * | 2/1998 | Peters .......................... 382/254 |
| 5,724,127 A | | 3/1998 | Csipkes et al. .............. 356/73.1 |
| 5,828,500 A | | 10/1998 | Kida et al. ................... 359/798 |
| 5,834,661 A | | 11/1998 | Nonaka et al. ............... 73/866 |
| 5,862,250 A | * | 1/1999 | Csipkes et al. .............. 382/141 |
| 5,870,184 A | * | 2/1999 | Furuhashi .................... 356/73.1 |
| 5,898,494 A | * | 4/1999 | Csipkes ....................... 356/511 |
| 5,902,935 A | | 5/1999 | Georgeson et al. .......... 73/801 |
| 5,943,123 A | * | 8/1999 | Oshimi et al. ............... 356/73.1 |
| 5,953,112 A | * | 9/1999 | Rosow et al. ................ 356/73.1 |
| 5,953,113 A | * | 9/1999 | Poffenbarger ............... 356/73.1 |
| 5,963,662 A | | 10/1999 | Vachtsevanos et al. ..... 382/150 |
| 5,965,877 A | * | 10/1999 | Wood et al. ................. 250/227.15 |
| 6,099,170 A | * | 8/2000 | Sarbell ........................ 385/99 |
| 6,201,599 B1 | * | 3/2001 | Ryu et al. .................... 356/73.1 |
| 6,269,179 B1 | | 7/2001 | Vachtsevanos et al. ..... 382/149 |
| 6,327,250 B1 | * | 12/2001 | Chen et al. .................. 370/241 |
| 6,356,300 B1 | * | 3/2002 | Shiba .......................... 348/130 |
| 6,369,883 B1 | * | 4/2002 | Clark ........................... 356/73.1 |
| 6,381,011 B1 | * | 4/2002 | Nickelsberg et al. ........ 356/73.1 |
| 2002/0054285 A1 | * | 5/2002 | Todo et al. .................. 356/73.1 |

OTHER PUBLICATIONS

"fotec FOtracers and Visual Fault Locators (VFL)", Fotec, Inc., 2000.
"Visual Fault Locator", OEM Products—Siemon, Copyright©1995–2002.

* cited by examiner

Primary Examiner—Diego Gutierrez
Assistant Examiner—R. Alexander Smith
(74) Attorney, Agent, or Firm—David A. Fox; Michael R. Cammarata

(57) ABSTRACT

A method for detecting defects in an optical device. The method includes obtaining an optical device that is a component of an optical communications system carrying information signals at a communications wavelength. Infrared light is applied to the optical device. The infrared light has a wavelength corresponding to the communications wavelength. An image of the optical device is obtained while the optical device is transmitting the infrared light. The image provides multidimensional data including positional values and intensity values. The image is then analyzed to detect defects in the optical device.

22 Claims, 8 Drawing Sheets

METHOD AND SYSTEM FOR INSPECTING OPTICAL DEVICES

BACKGROUND OF THE INVENTION

1. Field of Invention

The invention relates to a method and system for inspecting optical devices.

2. Description of Related Art

Inspection of optical devices, such as optical fiber, has been performed in a variety of ways. One technique is visual inspection performed by a human operator using a microscope. This type of human, visual inspection is a tedious and time-consuming task. Certain types of defects, such as a scratch in an optical fiber, are difficult to detect with the human eye.

A visual laser fault locator is an inexpensive and simple device to detect a defect in optical fiber. However, because the laser signal from the device is weak, the defect position is difficult to detect, the result is often inaccurate and the range of inspection is short. This type of device provides for quick inspection of short optical fibers.

An optical time domain reflectometer (OTDR) finds a fault location by measuring attributes of the input and output of the optical signal. One of advantage of the OTDR is that it provides a quantified result of the loss along the fiber. An OTDR, however, cannot detect fiber loss if isolators are inserted in the fiber path. The only way to inspect fiber paths including isolators with an OTDR is to cut the fiber and measure the loss. Locating the position of a defect in a complicated system such as an optical fiber cassette is difficult with an OTDR. Lastly, the OTDR is a relatively costly device.

SUMMARY OF THE INVENTION

A method for detecting defects in an optical device. The method includes obtaining an optical device that is a component of an optical communications system carrying information signals at a communications wavelength. Infrared light is applied to the optical device. The infrared light has a wavelength corresponding to the communications wavelength. An image of the optical device is obtained while the optical device is transmitting the infrared light. The image provides multidimensional data including positional values and intensity values. The image is then analyzed to detect defects in the optical device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF INVENTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
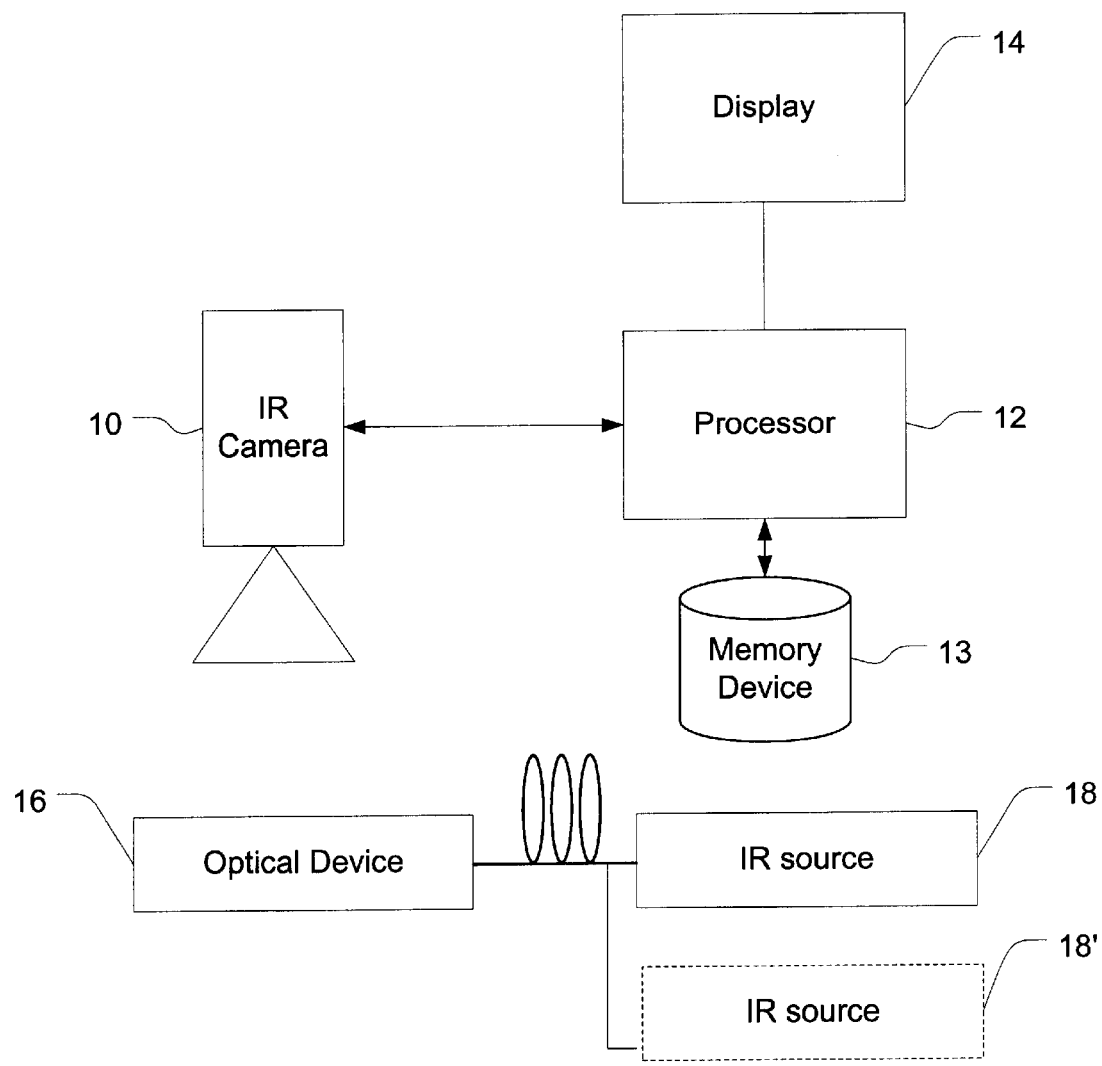
FIG. 1 is a block diagram of a system for inspecting optical devices.

FIG. 1 is a block diagram of an exemplary system for inspecting optical devices. The system includes a camera 10 coupled to a processor 12. The camera 10 is preferably an infrared camera that obtains an image of the optical device under test 16. The processor 12 may be implemented using a general-purpose computer implementing the processes described herein. The general-purpose computer may operate in response to a computer program stored in a storage medium 13 (e.g., hard drive) accessible by the computer. A display 14 is provided to allow a user to view images generated by camera 10 and to provide a graphical user interface to operate the system. Suitable input peripherals (not shown) such a keyboard, mouse, etc. may be coupled to processor 12.

The optical device under test 16 receives infrared light from an IR source 18 or has IR source internally. The optical device may be a component (e.g., a fiber, a spliced fiber, an optical filter, etc.) or may be an optical assembly (e.g., amplifier, transceiver, etc.) including a plurality of optical components. In an exemplary embodiment, the optical device under test is designed to be part of an optical communications system carrying an information signal at or about a communications wavelength. The IR source emits infrared light at a wavelength substantially equal to the communication wavelength. In an exemplary embodiment, the IR source 18 is a laser generating infrared light at a wavelength of 1550 nm.

A second IR source 18' may be used to test transmission characteristics of the device under test at a second wavelength. Again, the optical device under test is designed to be part of an optical communications system. This second wavelength is used in the optical communications network as a service channel, transmitting commands and other control information between network elements. In an exemplary embodiment, the second IR source 18' generates infrared light at a wavelength of about 1310 nm. Alternatively, the second IR source 18' generates infrared light at a wavelength of about 1625 nm.

The inspection system may be used to inspect a variety of optical devices for defects. One type of optical device that may be inspected is optical fiber. Certain types of fiber (such as recoated fiber) may include defects such as incomplete filling of epoxy, scratches, air bubbles, and/or contamination that cause the infrared light to leak out. The system of FIG. 1 may be used to detect such defects.

Figure 2:
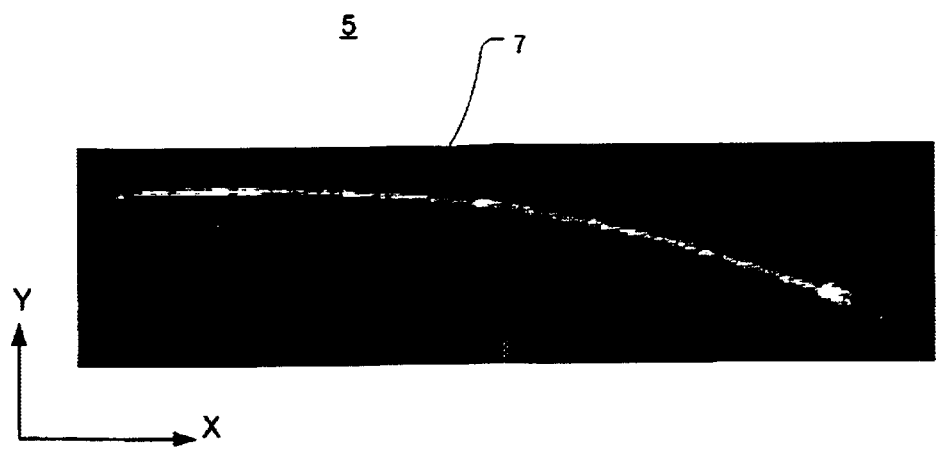
FIG. 2 is an exemplary image of an optical fiber.

FIG. 2 depicts and exemplary two-dimensional image 5 of a spliced and recoated fiber 7. As described above, IR source 18 is coupled to the fiber and the camera 10 acquires an image 5 as shown in FIG. 2. In other words, image 5 shown in FIG. 2 is the raw or base image from camera 10 and clearly shows the IR light leaking through the fiber. The image 5 is processed by processor 12 to locate areas of high intensity that indicate that a defect is present. When the infrared light passes through the fiber and encounters a defect (e.g., poor recoating, scratches, air bubbles, contamination) the infrared light is leaked or scattered causing an emission or bright spot in the image. Processor 12 process the image 5 to detect such defects.

Figure 4:
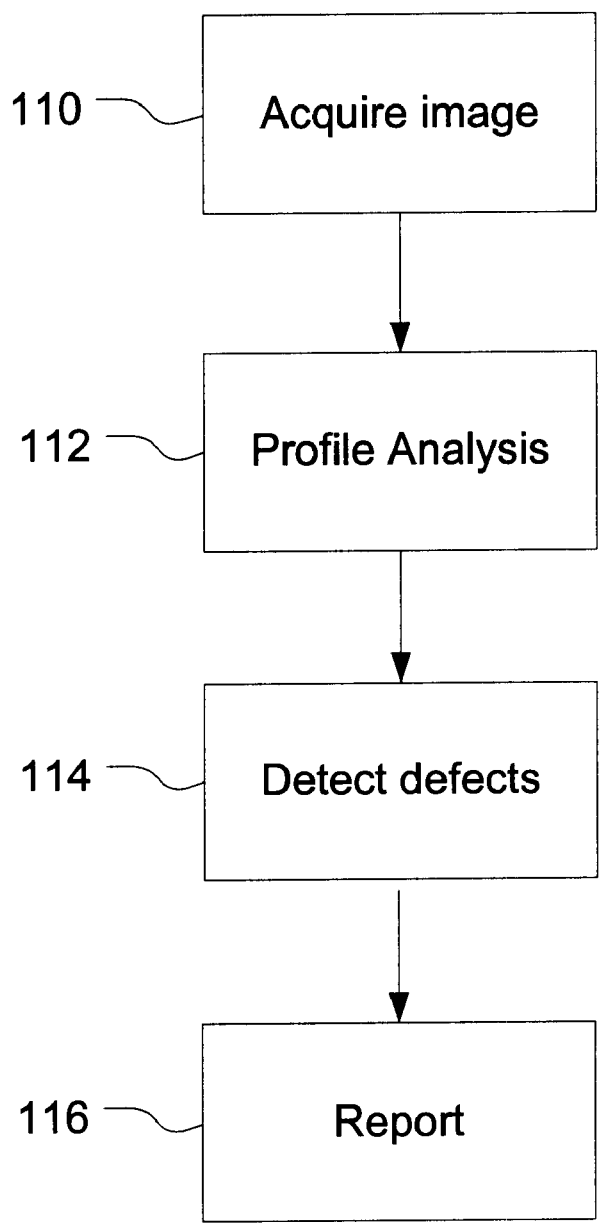
FIG. 4 is a flowchart of an exemplary process for detecting defects.

FIG. 4 is a flowchart of a process implemented by processor 12 to detect a defect in an image 5 of a fiber 7 such as that shown in FIG. 2. The process begins at step 110 where the image 5 is acquired. The inspection process may be performed in real time as the image 5 is acquired by camera 10 or may be performed on images stored in storage device 13. The image 5 is generated by applying an IR source to the fiber and then imaging the length of the fiber 7 with camera 10.

Figure 3:
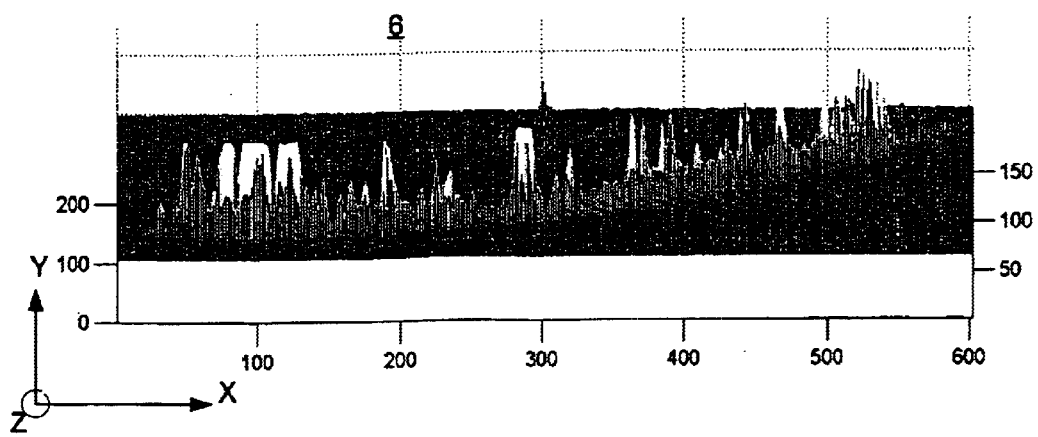
FIG. 3 depicts intensities in the image of FIG. 2.

An image plot 6, such as that shown in FIG. 3, is obtained at step 110. The image plot 6 provides a three-dimensional representation of the raw data in the form of a plot of IR intensity (i.e., a z component) for x, y locations in the image 5.

Figure 5:
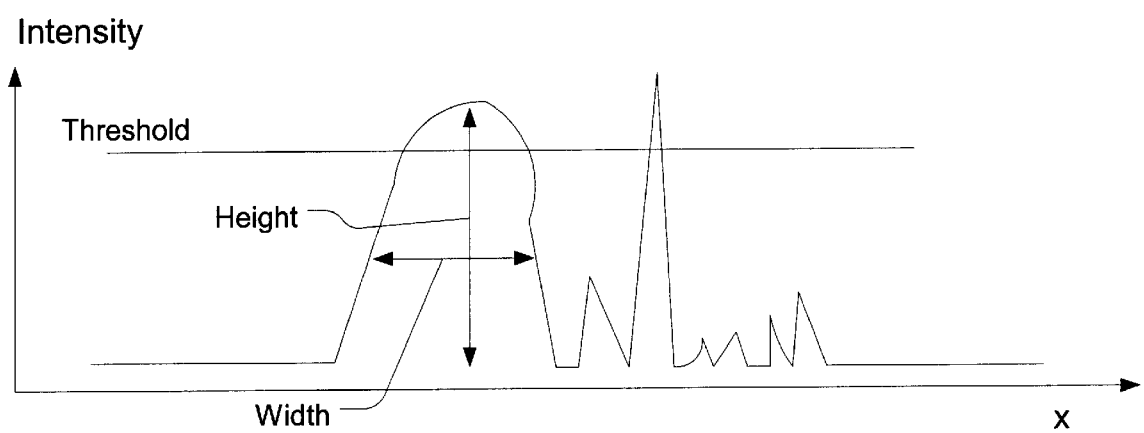
FIG. 5 depicts exemplary characteristics of a peak in the intensity.

At step 112, peaks in the image plot 6 are located which may correspond to defects in the fiber 7 because the peaks correspond to the maximum IR light leakage areas. This may be performed through a profile analysis routine that analyzes profiles in the image plot 6 and derives profile characteristics. For example, as shown in FIG. 5, profiles may be located by applying a threshold to the image 6. FIG. 5 is a simplified representation showing one dimensional axis and intensity such as in image plot 6. The profile analysis is preferably performed on three-dimensional data, namely x, y position and intensity. Profile characteristics such as peak height, peak width, height-to-width ratio, leading edge slope, trailing edge slope etc., may be derived to characterize the profile as either a defect or noise at step 114. Defects such as poor recoating, scratches, air bubbles, and contamination may be detected based on the profile of the infrared signal. A report may then be generated at step 116 notifying an operator of the defect and the results stored in a database.

The processing described above with respect to FIGS. 2–4 may be applied to a section of fiber, a fiber splice or a fiber splice within a splice protection device. Often, spliced fibers are positioned within a splice protection device which protects the fiber splice from, for example, tension on the splice region. By using an IR source 18 with sufficient power (e.g., 50 mw), defects in a splice encased in an IR-permeable splice protection device (e.g., plastic) can be imaged by camera 10.

Figure 6:
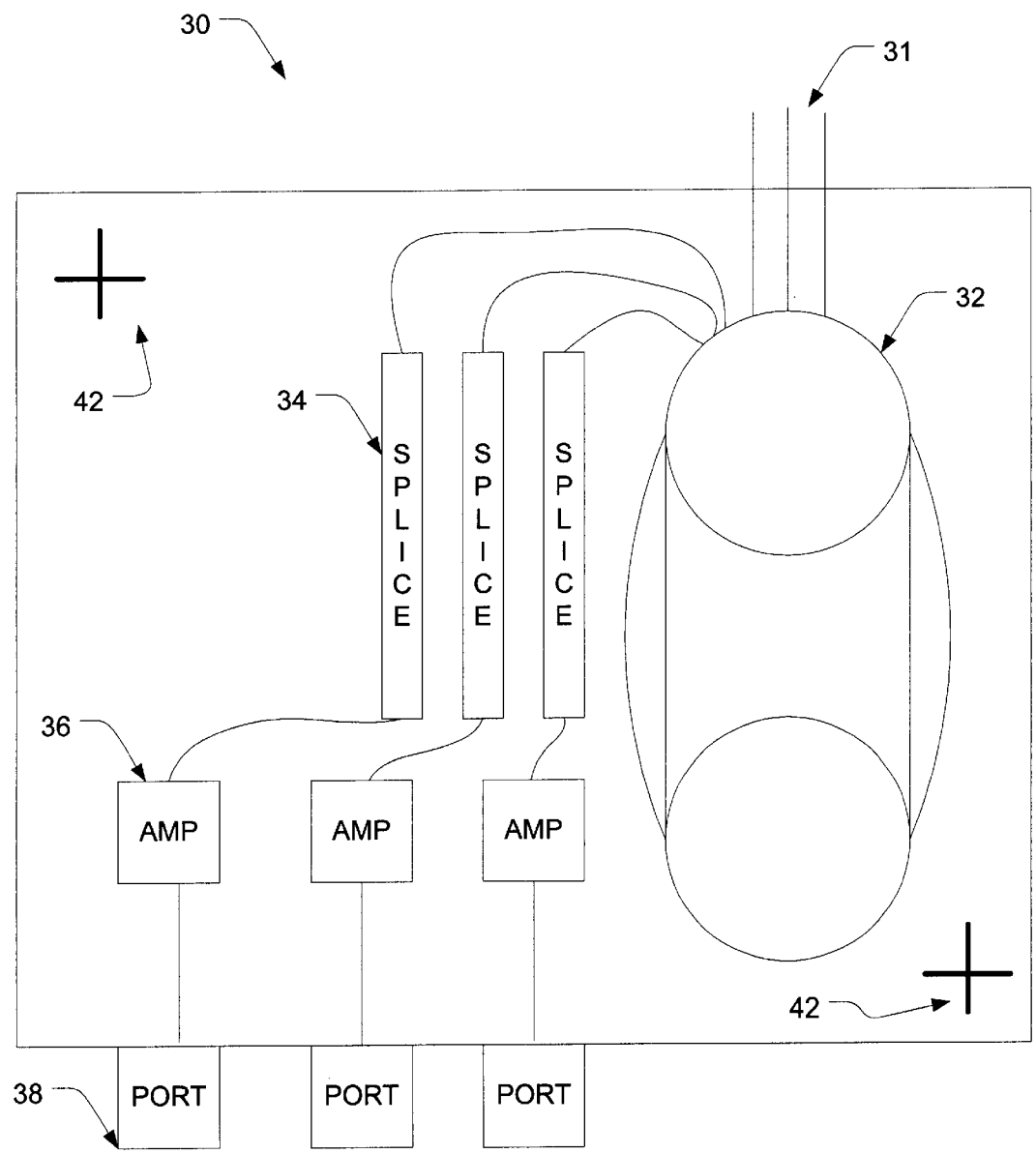
FIG. 6 depicts an exemplary optical subassembly.

In another embodiment of the invention, the system of FIG. 1 may be used to inspect more complex optical devices such as an optical subassembly. FIG. 6 depicts an exemplary optical device under test in the form of an optical subassembly 30. Optical subassembly 30 includes incoming fibers 31 that are wrapped around spools 32 to store excess fiber. The incoming fibers are spliced to input fibers for amplifiers 36 at splices 34. The output of amplifiers 36 are coupled by additional fiber to output ports 38.

Testing the optical subassembly 30 using conventional techniques would be difficult. Conventional techniques would involve applying an input at incoming fibers 31 and monitoring an output at output ports 38. If the signal is degraded, this indicates that a defect exists in the optical subassembly 30, but the location of the defect cannot be determined. To individually test the splices 34, each end of the spliced fiber must be destroyed and each splice must be inspect one by one. To individually test amplifiers 36 and output ports 38, the transmission path would need to be interrupted proximate to each component which is time-consuming.

Figure 7:
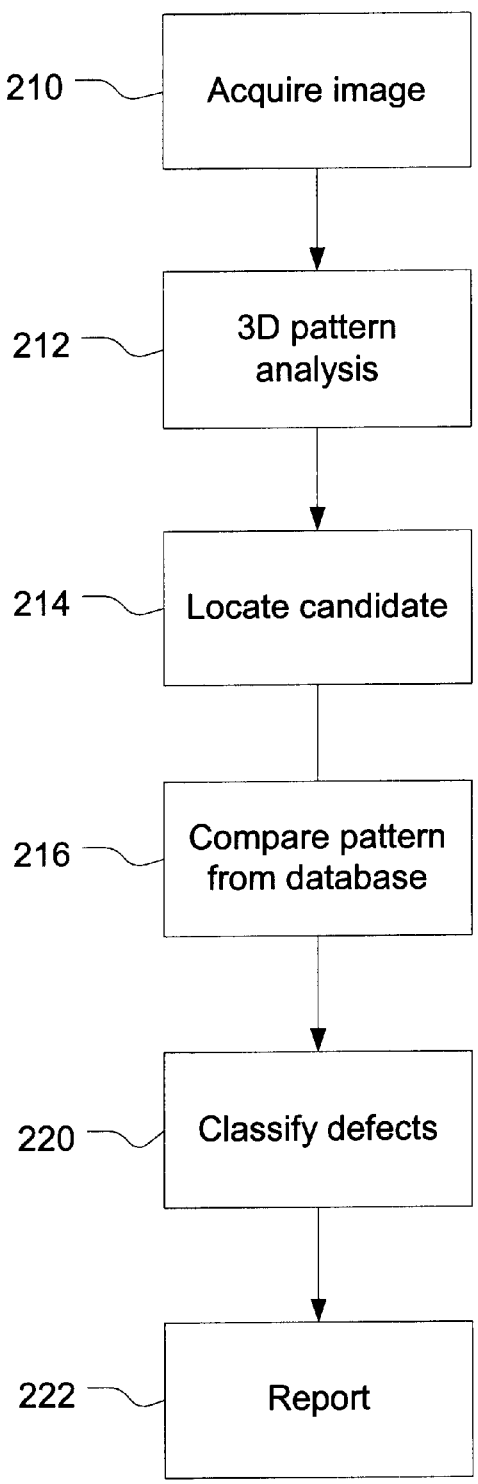
FIG. 7 is a flowchart of an exemplary process for detecting defects in the optical subassembly.

Using the system of FIG. 1, optical devices such as optical subassembly 30 can be tested quickly and non-invasively. The inspection process is depicted in the flowchart of FIG. 7. The process begins at step 210 where the image is acquired. The inspection process may be performed in real time as the image is acquired by camera 10 or may be performed on images stored in storage device 13. The image is generated by applying an IR source to the optical device and imaging the optical device with camera 10. Additionally, if the device under test is an active device, the device is activated (e.g., power is applied). The image provides three-dimensional data in the form of x, y coordinates defining locations in the image and a third dimension (e.g., z coordinate) of pixel intensity proportional to the infrared light detected by camera 10. In the example shown in FIG. 6, the IR source is applied to incoming fibers 31.

At step 212, three-dimensional pattern analysis is performed to distinguish noise from potential defects. The pattern analysis step locates profiles in the three-dimensional data to isolate potential defects. The profile information of the data such as peak height, peak width, height-to-width ratio, leading edge slope, trailing edge slope etc., may be derived to characterize a profile as either a defect or noise at step 212. Noise peaks are eliminated from further consideration.

At step 214, candidates for inspection are located in the image. These candidates are identified by profile pattern matching of three-dimensional data from the image that does not correspond to noise. The profiles from the image are analyzed and classified as defect candidates based on a database that stores information concerning patterns of defects.

At step 216, the candidates located in step 214 are compared to reference patterns in a database. The candidates may correspond to individual components located in the optical subassembly 30. For example, candidates may include splices 34, amplifiers 36 and ports 38. The optical subassembly 30 may include indicia 42 that define a coordinate system for the image from which areas of interest may be referenced. Thus, intensity peaks located outside predefined areas of interest may be ignored.

At step 220, the degree of correlation between the candidate image and the reference image is used to detect defects. If the two images have a predetermined degree of correlation, then no defect is present. For certain components, an intensity peak may be expected. For example, amplifiers 36 may be erbium-doped fiber amplifiers (EDFA's) that typically emit light when the amplifier is operating properly. To properly detect defects, processor 12 compares the acquired image to a reference image stored in the storage device 13. Differences between the acquired image and the reference image are indicative of a defect.

At step 222, a report is generated identifying any defects that are present and where the defects are located. As noted above, the coordinate system for the image is detected so that defect location can be determined and associated with a component (e.g., a specific amplifier) in the optical device.

This allows a technician to troubleshoot a single component rather than an entire subassembly.

Figure 8:
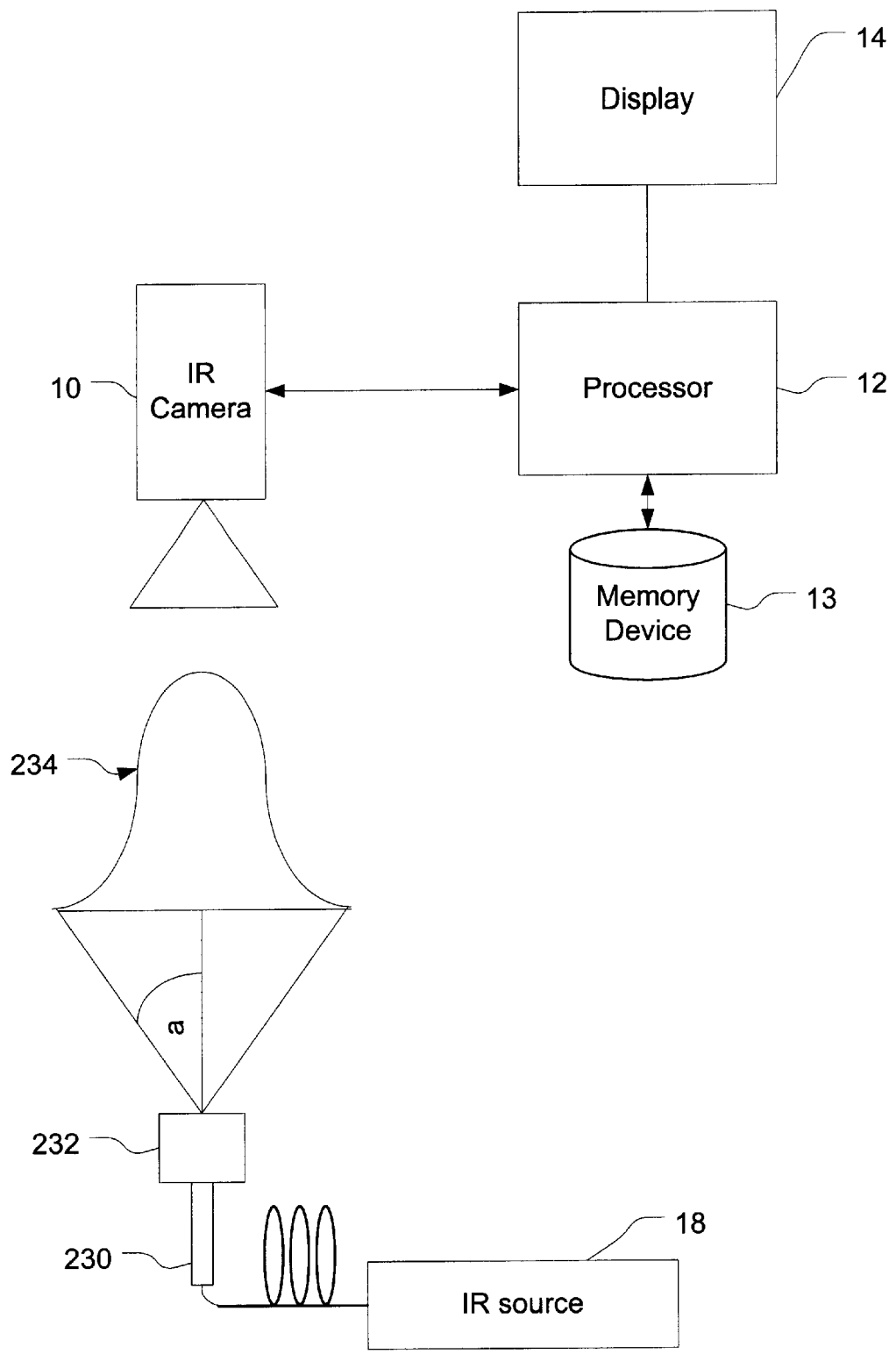
FIG. 8 is a block diagram of an alternate system for inspecting optical devices.

FIG. 8 depicts an alternate embodiment where the device under test is an end face of an optical fiber connector 232 coupled to an optical fiber 230. Camera 10 is directed towards the mating face of optical connector 232. Shown in FIG. 8 is an exemplary power distribution 234 of the light emitted from connector 232. Often such connectors are abutted face-to-face through an adapter to join to fiber paths.

In operation, an IR source 18 is applied to fiber 230 and the light emitted from connecter 232 captured by camera 10 and processed by processor 12. A number of characteristics of the light emitted by the connector 232 may be determined. The system of FIG. 8 can detect a variety of characteristics of the light emitted by connector 232. A first characteristic is the numerical aperture of the connector. Numerical aperture (NA) is associated with the angular spread of light from a central axis, as in exiting a fiber, emitting from a source, or entering a detector. As shown in FIG. 8, the NA may be expressed as sin(a). The detected NA may be compared to a reference NA to determine that the connector 232 meets standards. If two connectors having different NA's are abutted face-to-face, NA mismatch losses may occur.

Figure 9:
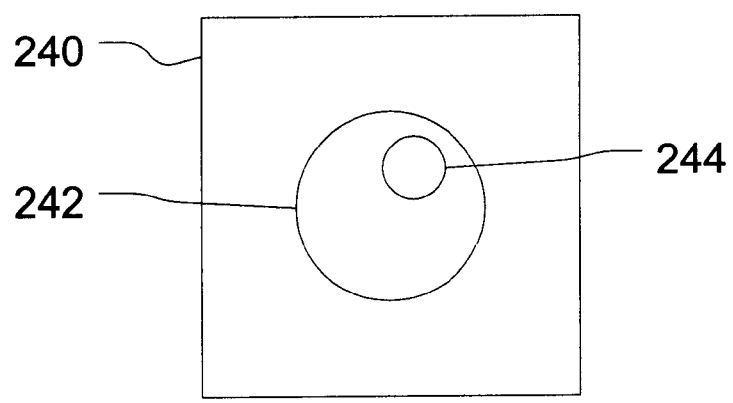
FIG. 9 is an end view of an optical connector.

The arrangement of FIG. 8 allows detection of other characteristics of connector 232. FIG. 9 depicts an end view of connector 232 where the connector housing 240 is visible along with the cladding 242 and core 244 of optical fiber 230. The core position is determined by light emitted from the end of connector 232 and concentricity of the core with respect to the cladding 242 can be detected. As seen in the example of FIG. 9, the light emitted from core 244 is offset from the center of the cladding 242. A lack of concentricity between the light emitted by core 244 and the cladding 242 will result in signal loss when the connector 232 is mated with a similar connector. The system of FIG. 8 determines the concentricity of the light emitted by core 244 and reports an error if concentricity fails to meet a reference value.

Figure 10:
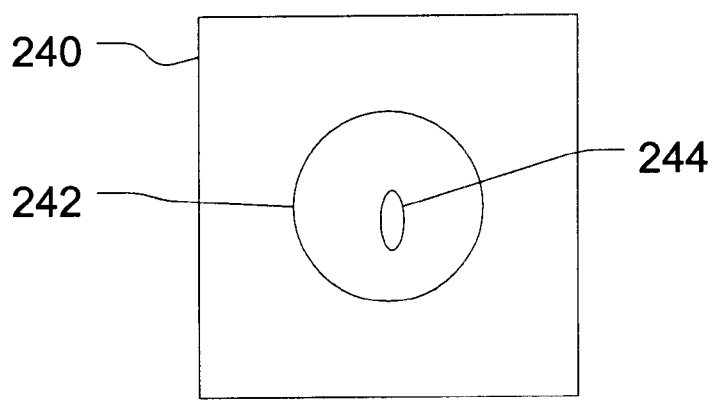
FIG. 10 is an end view of an optical connector.

Another characteristic detected using the system of FIG. 8 is ellipticity of light emitted by core 244. Ellipticity is a measure of the distortion from a circular pattern of light emitted by the core 244. Ellipticity may be determined based on known measurements, such as the ratio of the major and minor axis of the ellipse. As seen in the example of FIG. 10, the light emitted from core 244 is elliptical. Ellipticity in the light emitted by core 244 will result in signal loss when the connector 232 is mated with a similar connector. The system of FIG. 8 determines the ellipticity of the light emitted by core 244 and reports an error if ellipticity fails to meet a reference value.

A variety of defects may be detected using the system and methods described herein. As noted above, recoated fiber and/or spliced fibers may be inspected for defects. In addition, orientation of a splice may be confirmed by examining the infrared emissions of spliced fibers. In splices made up of two different types of fiber, one fiber will emit more light thus providing the ability to confirm the orientation of the splice. Fibers exceeding a minimum bend radius may also be detected as this condition causes the fiber to leak infrared light.

For certain components, the intensity of the image is used to provide quantitative information about the component. In one embodiment, the intensity of an image of a spliced fiber indicates that amount of signal loss at the splice. A high intensity in an image of a fiber splice indicates that a large amount of light is escaping the splice and thus signal loss is high. Measured brightness is correlated to signal loss through techniques such as mathematical formulae, look-up tables, etc. The measured intensity provides a measure of signal loss to determine if the fiber splice meets signal loss thresholds.

In addition to fibers, an optical subassembly containing a number of optical components may be inspected at one time. Operation of individual components may be confirmed through the inspection system (e.g., an operating amplifier emits certain amount of infrared light).

The invention being thus described, it will be obvious that the same may be varied in many ways. Such variations are not to be regarded as departure from the spirit and scope of the invention, and all such modificafions as would be obvious to one skilled in the art are intended to be included within the scope of the following claims.

What is claimed is:

1. A method for detecting defects in an optical device, the method comprising:

obtaining the optical device, the optical device being a component of an optical communications system carrying information signals at a communications wavelength;

applying infrared light to the optical device, the infrared light having a wavelength corresponding to the communications wavelength;

obtaining an infrared image of the optical device while the optical device is transmitting the infrared light, the infrared image providing multidimensional data including positional values and intensity values corresponding to the infrared light leaking from the optical device; and, analyzing the infrared image to detect defects in the optical device causing the infrared light to leak from the optical device, wherein the image is a two-dimensional image defining positional values along a first axis, position values along a second axis and intensity values along a third axis.

2. The method of claim 1 wherein the optical device is passive.

3. The method of claim 2 wherein the optical device is a splice of two optical fibers.

4. The method of claim 3 wherein the splice is positioned inside a splice protector.

5. The method of claim 3 further comprising:

measuring image intensity adjacent the splice; and, determining splice loss in response to the image intensity adjacent the splice.

6. The method of claim 1 wherein the optical device is an optical assembly of a plurality of optical components.

7. The method of claim 1 wherein said analyzing the image includes:

locating an intensity profile in the infrared image;

deriving profile characteristics for the intensity profile; and, classifying the intensity profile as a defect in response to the profile characteristics.

8. The method of claim 7 wherein the profile characteristics include peak height and peak width.

9. The method of claim 1 wherein said analyzing the image includes:

locating candidate objects in the infrared image, comparing the infrared image of the candidate object to a reference image of the candidate object; and, classifying said candidate object as defective in response to said comparing.

10. The method of claim 1 further comprising:

applying a second infrared light to the optical device, the second infrared light having a wavelength corresponding to second wavelength used in the optical communications system;

obtaining a second infrared image of the optical device while the optical device is transmitting the second infrared light, the second infrared image providing multidimensional data including positional values and intensity values; and, analyzing the second infrared image to detect defects in the optical device.

11. The method of claim 10 wherein the second wavelength corresponds to a service channel for the optical communications system.

12. A system for detecting defects in an optical device, the system comprising:

an infrared source coupled to the optical device, the optical device being a component of an optical communications system carrying information signals at a communications wavelength, the infrared source generating infrared light having a wavelength corresponding to the communications wavelength;

an infrared camera generating an infrared image of the optical device while the optical device is transmitting the infrared light, the infrared image providing multidimensional data including positional values and intensity values corresponding to the infrared light leaking from the optical device; and, a processor coupled to the camera and receiving the infrared image, said processor analyzing the image to detect defects in the optical device causing the infrared light to leak from the optical device, wherein the infrared image is a two-dimensional infrared image defining positional values along a first axis, position values along a second axis and intensity values along a third axis.

13. The system of claim 12 wherein the optical device is passive.

14. The system of claim 13 wherein the optical device is a splice of two optical fibers.

15. The system of claim 14 wherein the splice is positioned inside a splice protector.

16. The system of claim 14 wherein said processor:

measures image intensity adjacent the splice; and, determines splice loss in response to the image intensity adjacent the splice.

17. The system of claim 12 wherein the optical device is an optical assembly of a plurality of optical components.

18. The system of claim 12 wherein said processor:

locates an intensity profile in the infrared image;

derives profile characteristics for the intensity profile; and, classifies the intensity profile as a defect in response to the profile characteristics.

19. The system of claim 18 wherein the profile characteristics include peak height and peak width.

20. The system of claim 12 wherein said processor:

locates candidate objects in the infrared image, compares the infrared image of the candidate object to a reference image of the candidate object; and, classifies said candidate object as defective in response to said comparing.

21. The system of claim 12 further comprising:

a second infrared source providing a second infrared light to the optical device, the second infrared light having a wavelength corresponding to second wavelength used in the optical communications system;

said infrared camera obtaining a second infrared image of the optical device while the optical device is transmitting the second infrared light, the second infrared image providing multidimensional data including positional values and intensity values; and, said processor analyzing the second infrared image to detect defects in the optical device.

22. The system of claim 21 wherein the second wavelength corresponds to a service channel for the optical communications system.

* * * * *